United States Patent
Miller

(10) Patent No.: US 11,080,035 B2
(45) Date of Patent: Aug. 3, 2021

(54) ACCESSING A PATCH FILE IN A SYSTEM CENTER CONFIGURATION MANAGER (SCCM) ENVIRONMENT

(71) Applicant: VMware, Inc., Palo Alto, CA (US)

(72) Inventor: Jason Miller, St. Louis Park, MN (US)

(73) Assignee: VMware, Inc., Palo Alto, CA (US)

(*) Notice: Subject to any disclaimer, the term of this patent is extended or adjusted under 35 U.S.C. 154(b) by 67 days.

(21) Appl. No.: 13/766,453

(22) Filed: Feb. 13, 2013

(65) Prior Publication Data

US 2014/0229929 A1    Aug. 14, 2014

(51) Int. Cl.
G06F 8/65     (2018.01)
G06F 21/10    (2013.01)

(52) U.S. Cl.
CPC .............. *G06F 8/65* (2013.01); *G06F 21/105* (2013.01)

(58) Field of Classification Search
CPC ..... G06F 8/60; G06F 8/65; G06F 8/68; G06F 21/105
See application file for complete search history.

(56) References Cited

U.S. PATENT DOCUMENTS

| | | | |
|---|---|---|---|
| 7,676,448 B2* | 3/2010 | Henderson et al. | 717/171 |
| 8,856,953 B2* | 10/2014 | Antill | G06F 21/10 717/168 |
| 2004/0015938 A1* | 1/2004 | Taylor | 717/168 |
| 2005/0210459 A1* | 9/2005 | Henderson et al. | 717/168 |
| 2006/0026304 A1* | 2/2006 | Price | G06F 8/65 710/8 |
| 2006/0064685 A1* | 3/2006 | DeFolo | 717/169 |
| 2008/0244553 A1* | 10/2008 | Cromer | G06F 21/572 717/168 |
| 2011/0138374 A1* | 6/2011 | Pal | 717/169 |
| 2012/0054875 A1* | 3/2012 | Antill | G06F 8/65 726/28 |
| 2012/0174090 A1* | 7/2012 | Carollo | G06F 8/65 717/173 |
| 2013/0055228 A1* | 2/2013 | Song et al. | 717/168 |

OTHER PUBLICATIONS

Wikipedia, "Software agent," 2012, downloaded from the Wayback Machine Internet Archive at <URL>: http://web.archive.org/web/20121113001710/http://en.wikipedia.org/wiki/Software_agent on Aug. 16, 2016.*

Yegulalp, "System Center Updates Publisher zeroes in on third-party updates," 2012, pp. 1-10, downloaded on Mar. 2, 2017 from The Wayback Machine Internet Archive at <url>:https://web.archive.org/web/20120303190205/http://searchwindowsserver.techtarget.com/tip/System-Center-Updates-Publisher-zeroes-in-on-third-party-updates.*

* cited by examiner

Primary Examiner — S. Sough
Assistant Examiner — Stephen D Berman

(57) ABSTRACT

A computer-implemented method for accessing a patch file for use in a system center configuration manager (SCCM) environment. The method includes accessing a patch file by a patch file agent, wherein the patch file agent is located in a system center configuration manager (SCCM) environment; and providing the patch file, by the patch file agent, to a server update services (SUS) without requiring use of a system center updates publisher (SCUP).

11 Claims, 4 Drawing Sheets

200

```
ACCESS A PATCH FILE BY A PATCH FILE AGENT, WHEREIN THE
PATCH FILE AGENT IS LOCATED IN A SCCM ENVIRONMENT
210

ACCESS A PATCH FILE FROM A CLOUD COMPUTING
    ENVIRONMENT
    212

ACCESS AN ENCRYPTED PATCH FILE
    214

AUTOMATICALLY ACCESS A PATCH FILE BY A PATCH FILE
    AGENT
    216

ACCESS A THIRD-PARTY PATCH FILE BY A THIRD-PARTY
    PATCH FILE AGENT LOCATED IN A SCCM ENVIRONMENT
    218
```

```
PROVIDE THE PATCH FILE, BY THE PATCH FILE AGENT, TO SUS
WITHOUT REQUIRING USE OF SCUP
220

AUTOMATICALLY PROVIDE THE PATCH FILE
    222
```

```
PREVENT ACCESS TO CLEAR TEXT IN THE PATCH FILE
230
```

```
SELECT PATCHES IN THE PATCH FILE TO BE IMPLEMENTED
240
```

```
┌─────────────────────────────────────────────────────────────┐
│ PROVIDE A THIRD PARTY PATCH FILE AGENT FOR USE IN A SCCM    │
│ ENVIRONMENT, WHEREIN THE THIRD PARTY PATCH FILE AGENT IS    │
│           TO ACCESS A THIRD PARTY PATCH FILE                │
│                            410                              │
└─────────────────────────────────────────────────────────────┘
                              ↓
┌─────────────────────────────────────────────────────────────┐
│ PROVIDE A LICENSE TO ALLOW INSTALLATION OF THE THIRD PARTY  │
│  PATCH FILE AGENT ON THE SCCM ENVIRONMENT SUCH THAT         │
│ REVENUE IS ENHANCED BASED ON PURCHASING THE LICENSE FROM A  │
│  THIRD PARTY TO ALLOW THE INSTALLATION OF THE THIRD PARTY   │
│  PATCH FILE AGENT ON THE SCCM ENVIRONMENT AND TO ALLOW THE  │
│              ACCESS TO THE THIRD PARTY PATCH FILE           │
│                            420                              │
└─────────────────────────────────────────────────────────────┘

┌─────────────────────────────────────────────────────────────┐
│    PREVENT THE INSTALLATION OF THE THIRD PARTY PATCH FILE   │
│              WHEN THE LICENSE IS NOT PURCHASED              │
│                            430                              │
└─────────────────────────────────────────────────────────────┘

┌─────────────────────────────────────────────────────────────┐
│   PREVENT THE ACCESS TO THE THIRD PARTY PATCH FILE WHEN     │
│              THE LICENSE IS NOT PURCHASED                   │
│                            440                              │
└─────────────────────────────────────────────────────────────┘

┌─────────────────────────────────────────────────────────────┐
│   VALIDATING SAID LICENSE, BY SAID PATCH AGENT, WITH A      │
│              CLOUD COMPUTING ENVIRONMENT                    │
│                            450                              │
└─────────────────────────────────────────────────────────────┘
```

ACCESSING A PATCH FILE IN A SYSTEM CENTER CONFIGURATION MANAGER (SCCM) ENVIRONMENT

BACKGROUND

Using Microsoft® System Center Updates Publisher (SCUP) to facilitate in deploying third party non-Microsoft® patch files has various deficiencies. Such deficiencies may include, among other things, manipulating the patch file by nefarious individuals, accessing proprietary information of the patch file, and time consuming manual intervention by IT professionals.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIGS. 2 and 3 depict some embodiments of methods for accessing a patch file for use in a SCCM environment.

FIG. 4 depicts an embodiment of a method for enhancing revenue based on use of a patch file agent in a SCCM environment.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope of the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Figure 1:
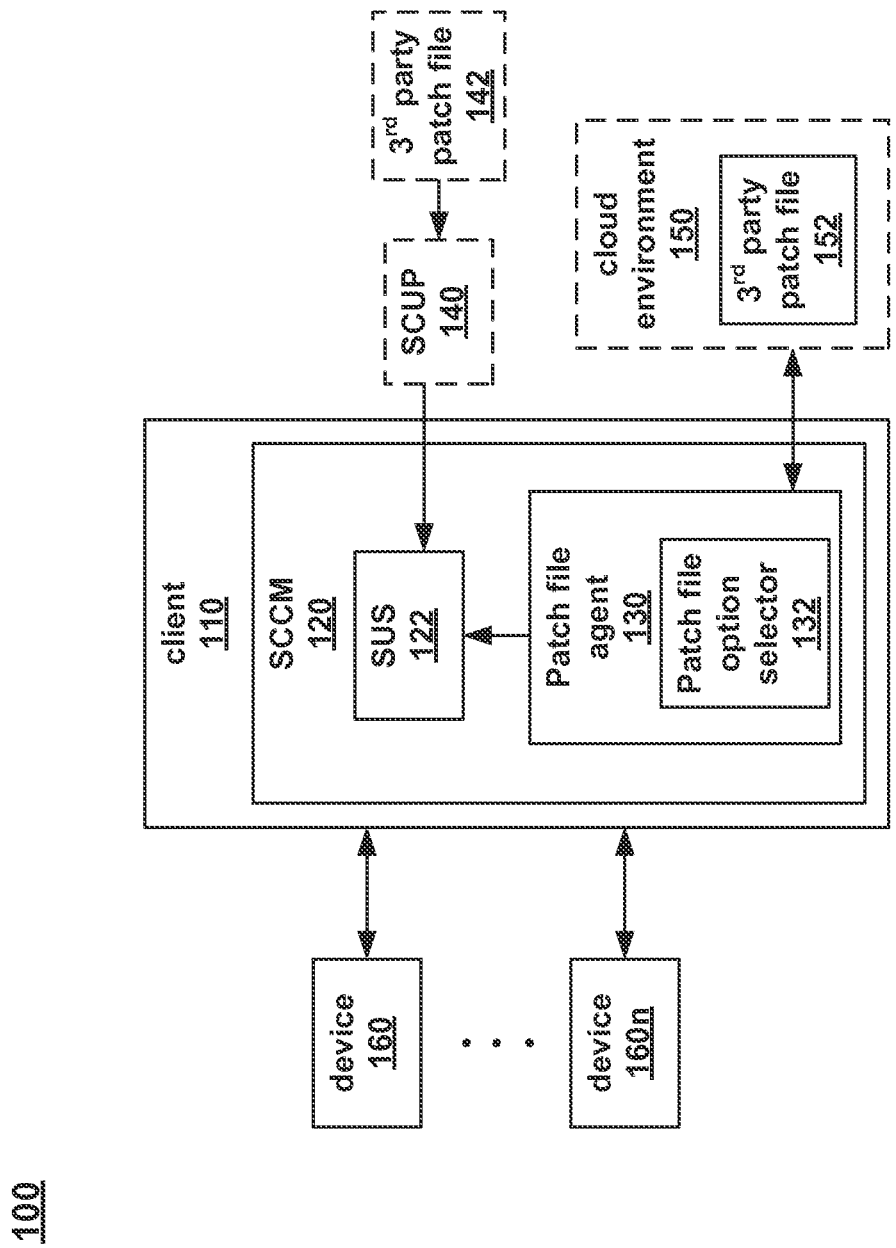
FIG. 1 is a block diagram that illustrates an embodiment of computing environment.

FIG. 1 depicts a block diagram that illustrates an embodiment of computing environment 100. Computing environment 100 includes a plurality of physical and/or virtual machine devices (e.g., devices 160-160n) that are coupled to one another in a network, and are managed, in part, by client 110. For example, the devices are managed centrally by one or more Information Technology (IT) professionals via client 110.

Computing environment 100 may include any number of physical and/or virtual machines. For example, in some embodiments, computing environment 100 is a corporate computing environment that includes tens of thousands of physical and/or virtual machines (e.g., devices 160-160n).

Devices 160-160n include a variety of installed software. Some devices may have the same installed software, while some devices may have different installed software. The installed software may be one or more software applications from one or more vendors (e.g., Microsoft®, Adobe®, Apple®, Mozilla®, etc.). Some examples of such installed software include, but are not limited to: e.g., various Microsoft® products, Adobe Reader®, Adobe Flash®, Apple Quicktime®, Mozilla Firefox®, etc.

In some instances, the installed software may need updating, for example, to fix errors, bugs, security issues, etc. As such, a patch or patches may be provided to update the software, for example, to resolve the error/security issues, etc. The patches may be provided by the vendor of the installed software and/or from different third-parties, which will be described in further detail below.

Client 110 utilizes a system center configuration manager (SCCM) 120, such as Microsoft's® System Center Configuration Manager, to facilitate in managing devices 160-160n. In one embodiment, client 110 is a server. In general, an SCCM is a systems management software product for managing large groups of Windows®-based computer systems. An SCCM provides, among other things, remote control, patch management, software distribution, operating system deployment, network access protection, hardware and software inventory, etc.

In one embodiment, computing environment 100 includes a single application of SCCM 120 to facilitate in managing computing environment 100. In such an embodiment, the single application of SCCM 120 is installed and executed on a single client (e.g., client 110).

Client 110 also utilizes a server update service (SUS) 122 such as, Windows® Server Update Services (WSUS), to facilitate in managing devices 160-160n. For example, SUS 122 enables administrators to manage the distribution of updates and hotfixes to devices 160-160n in computing environment 100. More specifically, SCCM 120 and SUS 122, which are installed and executed on client 110, work together for managing the distribution of application updates in computing environment 100, which will be described in further detail below.

The SCCM/SUS environment is typically provided by a single second party vendor, such as Microsoft®, and thus natively supports updates to that second party vendor's applications that are installed on devices 160-160n (e.g., if SCCM 120 and SUS 122 are Microsoft® products they natively support updates to Microsoft® application on devices 160-160n). For instance, when a single second party vendor provides both SCCM 120 and SUS 122, a patch file from that second party vendor for patching the second party's applications (not shown) is transmitted to SUS 122. Accordingly, IT professionals are able to direct the patch files, via SUS 122, to any one of devices 160-160n to patch or update the second party vendor's applications on such devices.

It is noted that a first party is the user or owner of client 110. Moreover, the first party, second party (e.g., Microsoft®) and third party (e.g., VMware®) are different parties.

In various embodiments, client 110 includes a Windows® operating system. However, client 110 can include any operating system that can interact with SCCM 120 and SUS 122.

The SCCM/SUS environment does not natively support third party patch files (e.g., non-Microsoft® patch files) for updating third party applications (e.g., non-Microsoft® applications). However, system center updates publisher (SCUP) 140 (e.g., Microsoft® System Center Updates Publisher) may be utilized for deploying third party, non-Microsoft® updates in the SCCM/SUS environment. For example, patch file 142 (e.g., a third party, non-Microsoft® patch file) for a non-Microsoft® Application (e.g., Sun Java Runtime Environment (JRE)) is transmitted to SUS 122 via SCUP 140. Accordingly, the patch file 142 may be deployed to any of devices 160-160n to patch or update any of the third-party, non-Microsoft® Applications on such devices via SCCM 120 that controls SUS 122.

In various embodiments, patch file 142 is in a clear text XML format. In general, clear text is transmitted or stored text that is not encrypted.

By using SCUP 140, data in patch file 142 may be viewed and/or accessed by a user of client 110. In particular, the patch file may be modified to include a virus or other malicious code. For example, a user of client 110 or a person gaining access to client 110 with nefarious intent may insert a virus or malicious code into patch file 142. As a result, the virus will infect any of the devices that receive and install the modified patch file.

Moreover, patch file 142 may be proprietary in nature and such proprietary data may be accessed and provided to other parties who may use the proprietary data for monetary gain. As such, the vendor of patch file 142 may lose revenue to the unauthorized sharing of the proprietary data.

In various embodiments, SCCM 120, SUS 122 and SCUP 140 are applications provided by the second party vendor. In some examples, SCCM 120, SUS 122 and SCUP 140 are Windows® based applications. However, SCCM 120, SUS 122 and SCUP 140 can be from any second party vendor or various second party vendors.

Patch file agent 130 is utilized to facilitate in deploying third-party patch files (e.g., non-Microsoft® patch files) to devices in network such that SCUP 140 is bypassed. That is, SCUP 140 is not required to be utilized or installed in order to deploy third-party non-Microsoft® patch files to devices in computing environment 100.

In particular, patch file 152 is transmitted to third party patch file agent 130. Patch file 152 is any third party, non-Microsoft® patch file (e.g., similar to patch file 142). Patch file 152 is transmitted to SUS 122 via patch file agent 130. Accordingly, patch file 152 is transmitted to any of devices 160-160n, via SUS 122, to patch or update any of the third-party, non-Microsoft® Applications on such devices.

As a result, patch file 152 is able to be deployed to any one of devices 160-160n by bypassing SCUP 140. Therefore, the information (e.g., clear text) in patch file 152 is not able to be viewed by a user of client 110. For instance, the data of patch file 152 is not able to be viewed or accessed, for example, by IT personnel or other users with nefarious intent.

In one embodiment, patch file 152 is a catalog with up-to-date information from multiple third party vendors in a single file.

It should be appreciated that, in one embodiment, patch file 152 may be encrypted prior to be received by patch file agent 130.

Patch file agent 130 is a small and "light" feature that is simple to install and configure. As such, it is inexpensive to purchase and takes little time to configure as compared to a "heavy" application. A "heavy" application is a robust application because it has many various functions and capabilities. As such, it may take an IT professional, many hours or days to properly install and configure the heavy application. Additionally, such applications are quite expensive because of the robust functionality.

Patch file 152 may be automatically transmitted to patch file agent 130, for example, in one embodiment, from cloud environment 150. The patch file is automatically transmitted to SUS 122. IT professionals approve the patches in SCCM 120. Upon approval, devices 160-160n automatically receive the patch file information from SCCM 120.

In contrast, when SCUP 140 is utilized, more manual intervention, by IT personnel, is required, among other things, to download the patch file, import the patch file and publish/deploy the patch file. Accordingly, the cost associated to deploy the patch files via SCUP is increased due to the manual intervention.

In various embodiments, patch file 152 may be accessed at various times from the vendor. For example, patch file 152 may be automatically transmitted to patch file agent 130 at a predetermined time (e.g., weekly), or transmitted once the patch file is generated by the vendor, etc.

Cloud environment 150 is any device or devices that include at least one processor and memory (not shown). Cloud environment 150 may be controlled and managed by the third party that provides the third party patch file 152.

Cloud environment 150 may be located in an Internet connected data center or a private cloud computing center coupled with one or more public and/or private networks. Cloud environment 150 typically couples with a virtual or physical entity (e.g., client 110 or any other devices in computing environment 100) through a network connection which may be a public network connection, private network connection, or some combination thereof. For example, a user in computing environment 100 may couple via an Internet connection with cloud environment 150 by accessing a web page or application presented by cloud environment 150 at a virtual or physical entity (e.g., client 110) with the computing environment.

In one embodiment, data may be transmitted to cloud environment 150 from client 110. For example, a scan of devices 160-160n is performed to determine which applications need (or don't need) updates. The information from the scan can be transmitted to cloud environment 150 via patch file agent 130.

Patch file agent 130, in one embodiment, includes patch file option selector 132. Patch file option selector 132 is configured to allow a user to select any options that a patch file may have and/or allow the user to select which devices and/or which applications on such devices that the patch file will be deployed to.

Example Methods of Operation

Figure 3:
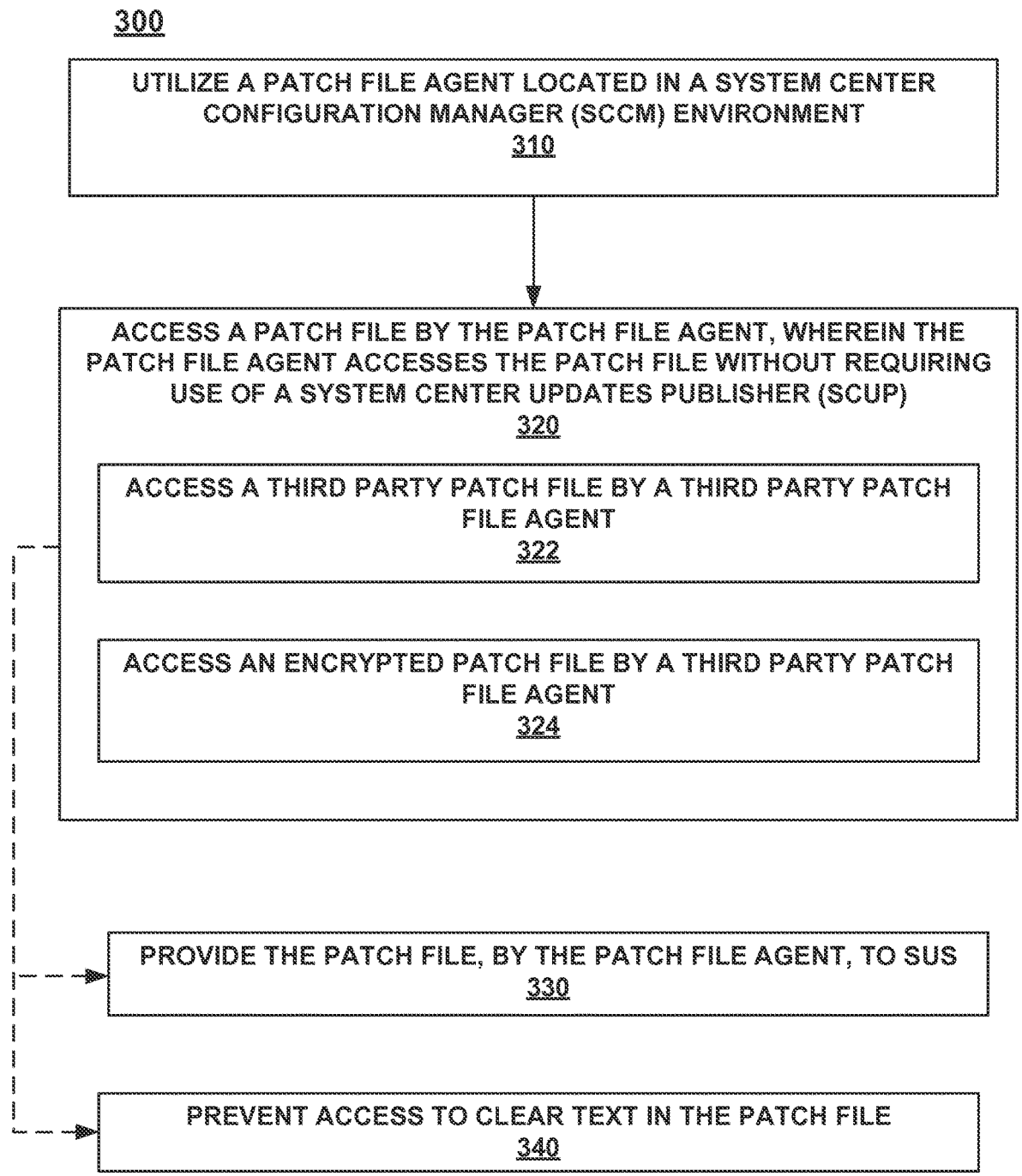

The following discussion sets forth in detail the operation of some example methods of operation of embodiments. With reference to FIGS. 2, 3 and 4, flow diagram 200, 300 and 400 illustrate example procedures used by various embodiments. Flow diagrams 200, 300 and 400 include some procedures that, in various embodiments, are carried out by a processor under the control of computer-readable and computer-executable instructions. In this fashion, procedures described herein and in conjunction with flow diagrams 200, 300 and/or 400 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environment 100 and/or cloud environment 150. The computer-readable and computer-executable instructions, which reside on tangible computer readable storage media, are used to control or operate in conjunction with, for example, one or some combination of processors of computer environment 100 and/or cloud environment 150. It is appreciated that the processor(s) may be physical or virtual or some combination (it should also be appreciated that a virtual processor is implemented on physical hardware). Although specific procedures are disclosed in flow diagrams 200, 300 and/or 400, such procedures are examples. That is, embodiments are well suited to performing various other procedures or variations of the procedures recited in flow diagrams 200, 300 and/or 400. Likewise, in some embodiments, the procedures in flow diagrams 200, 300 and/or 400 may be performed in an order different than presented and/or not all of the procedures described in one or more of these flow diagrams may be performed. It is further appreciated that procedures described in flow diagrams 200, 300 and/or 400 may be implemented in hardware, or a combination of hardware with firmware and/or software.

FIGS. 2 and 3 depict embodiments of flow diagrams for methods for accessing a patch file for use in a SCCM environment (e.g., a Microsoft® SCCM environment).

Referring now to FIG. 2, at 210, a patch file is accessed by a patch file agent. The patch file agent is located in a SCCM environment. For example, patch file 152 is accessed by patch file agent 130, wherein patch file agent 130 is installed on client 110. Moreover, client 110 also includes SCCM 120 and SUS 122 (e.g., Windows® SUS).

At 212, in one embodiment, a patch file is accessed from a cloud computing environment. For example, patch file agent 130 accesses patch file 152 which is located in cloud environment 150.

At 214, in another embodiment, an encrypted patch file is accessed. For example, patch file 152 is transmitted as an encrypted file to patch file agent 130. Once the patch file is sent to client 110, through patch file agent 130, patch file agent 130 decrypts patch file 152 in memory and processes the data into SUS 122. This prevents individuals from locating the clear text XML file on client 110 and disclosing the unencrypted information to non-paying customers or modify the information in SCUP 140.

At 216, in a further embodiment, a patch file is automatically accessed by a patch file agent. For example, patch file agent 130 automatically accesses patch file 152. In contrast, in convention methods, an IT professional has to, among other things, manually download the provided patch file.

At 218, in one embodiment, a third-party patch file is accessed by a third-party patch file agent located in a SCCM environment. For example, patch file 152 is a third party non-Microsoft® patch file for a third party non-Microsoft® application installed on any of devices 160-160n. Accordingly, patch file agent 130 (a third party non-Microsoft® patch file agent) which is located on client 110, in a SCCM/WSUS environment, accesses patch file 152.

At 220, the patch file is provided, by the patch file agent, to SUS (e.g., WSUS) without requiring use of SCUP (e.g., Microsoft® SCUP). For example, patch file agent 130 transmits patch file 152 to SUS 122. As such, SCUP 140 is bypassed and not utilized.

At 222, in one embodiment, the patch file is automatically provided to WSUS. For example, in response to receiving the patch file, patch file agent 130 automatically transmits patch file 152 to WSUS 122.

At 230, access to the clear text in the patch file is prevented. For example, when patch file 152 is transmitted to patch file agent 130 and then onto WSUS 122, a user of client 110 is unable to access or view the clear text in the patch file. In particular, the access to the clear text is prevented because the patch file is deployed by bypassing SCUP 140.

At 240, one or more patches in the patch file are selected to be implemented. For example, patch file 152 may include various options for patching various applications. Therefore, a user may select which patches or patch options, via patch file option selector 132, that are to be implemented on various applications in devices 160-160n.

Referring now to FIG. 3, a patch file agent is utilized and located in a system center configuration manager (SCCM) environment (e.g., Microsoft® SCCM environment). For example, patch file agent 130 is installed on client 110, which is a server having SCCM 120 and SUS 122 installed thereon.

At 320, a patch file is accessed by the patch file agent, wherein the patch file agent accesses the patch file without requiring use of SCUP (e.g., Microsoft® SCUP). For example, patch file agent 130 accesses patch file 152 such that the patch file agent access the patch file without requiring the use of SCUP 140. In other words, patch file agent 130 bypasses SCUP 140 when patch file 152 is accessed.

At 322, in one embodiment, a third party patch file is accessed by a third party patch file agent. For example, patch file 152 is a third party non-Microsoft® patch file that is accessed by patch file agent 130, which is a third party non-Microsoft® agent.

At 324, in another embodiment, an encrypted patch file is accessed by a third party patch file agent. For example, third party patch file 152 is encrypted and stored in cloud environment 150. As such, patch file agent 130 accesses the encrypted patch file.

At 330, the patch file is provided by the patch file agent to SUS. For instance, patch file agent 130 transmits patch file 152 to SUS 122 (e.g., WSUS) for deployment to any one of devices 160-160n. In various embodiments, patch file 152 may be fully encrypted, may be fully clear text, or may have some combination of encrypted and clear text content.

At 340, access to the clear text in the patch file is prevented. For example, when patch file 152 is transmitted to patch file agent 130 and then onto SUS 122, a user of client 110 (e.g., authorized or unauthorized user) is unable to access or view the clear text in the patch file. In particular, the access to the clear text is prevented, in one embodiment, because the patch file is deployed by bypassing SCUP 140.

FIG. 4 depicts an embodiment of a method for enhancing revenue based on use of a patch file agent in a SCCM environment (e.g., a Microsoft® SCCM environment).

At 410, a third party patch file agent is provided for use in a SCCM environment, wherein the third party patch file agent is to access a third party patch file. For example, a third party non-Microsoft® vendor generates and provides a third party patch file agent 130 for use in a SCCM/WSUS environment.

At 420, a license to allow installation of the third party patch file agent on the SCCM environment is provided, such that revenue is enhanced based on purchasing the license from a third party to allow the installation of the third party patch file agent on the SCCM environment and to allow the access to the third party patch file.

For example, the third party (e.g., non-Microsoft® party) provides a license for use of and installation of patch file agent 130 on client 110. Accordingly, if the license is purchased, then patch file agent 130 is able to be installed on client 110 and access to patch file 152 is provided. Accordingly, revenue for the third party is enhanced based on the purchase of the license for access to the third party patch files.

At 430, installation of the third party patch file agent is prevented if the license is not purchased. For example, if a license to install the third party patch file agent is not purchased, then the third part patch file agent is prevented from being installed on client 110.

At 440, access to the third party patch file is prevented when the license is not purchased. For example, if a license to either install the third party patch file agent or to access the third party patch files is not purchased, then access to the third party patch files is prevented.

At 450, the license is validated, by the patch agent, with a cloud computing environment. For example, patch file agent 130 validates the license with cloud environment 150 to ensure the license is still valid. If the license is valid, patch file agent 130 downloads patch file 152 and the patching proceeds, as described above.

If the license has expired, patch file agent 130 is required to take no action. Moreover, because the data provided by patch file 152 is provided based on a valid license, patch file 152 is not accessible if the license has expired and cannot be accessible until the license is renewed.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A computer-implemented method for accessing a third party patch file for use in a second party system center configuration manager (SCCM) environment, said computer-implemented method comprising:
    accessing a third party patch file by a third party patch file agent, wherein said third party patch file is for patching third party files, wherein said third party patch file agent is located in said second party system center configuration manager (SCCM) environment, and wherein said SCCM environment operates on a client belonging to a first party;
    automatically providing said third party patch file, by said third party patch file agent, to a second party server update services (SUS) executing on said client, wherein said third party patch file is automatically transmitted to said SUS from said third party patch file agent without requiring manual intervention by information technology (IT) personnel, said third party patch file agent automatically transmitting said third party patch file to said SUS at a predetermined time interval, and wherein said third party patch file bypasses a system center updates publisher (SCUP) such that manual intervention associated with implementing said third party patch file is reduced, and wherein an authorized user of said client is unable to access or view data of said third party patch file, and wherein users of said client, including any authorized users are prevented from accessing or viewing clear text in said third party patch file, wherein said data comprises said clear text, and wherein said first party, said second party, and said third party are different parties; and
    said third party patch file agent including a patch file option selector, said patch file option selector configured to allow said authorized user of said client to select any options of said third party patch file or allow said user of said client to select which devices and which applications on said devices to which said third party patch file will be deployed.

2. The computer-implemented method of claim 1, wherein said accessing a third party patch file by a third party patch file agent further comprises:
    accessing a third party patch file from a cloud computing environment.

3. The computer-implemented method of claim 1, wherein said accessing a third party patch file by a third party patch file agent further comprises:
    accessing an encrypted third party patch file.

4. The computer-implemented method of claim 1, further comprising:
    selecting patches in said third party patch file to be implemented.

5. A system comprising:
    a client comprising a central processing unit (CPU), said client belonging to a first party;
    a second party system center configuration manager (SCCM) disposed on a memory of said client;
    a second party server update service (SUS) that is executed on said client;
    a third party patch file agent located in said second party SCCM, wherein said third party patch file agent is configured to access a third party patch file from a cloud computing environment and to automatically provide said third party patch file to said second party SUS, wherein said third party patch file is automatically transmitted to said SUS from said third party patch file agent without requiring manual intervention by information technology (IT) personnel, said third party patch file agent automatically transmitting said third party patch file to said SUS at a predetermined time interval, and wherein said third party patch file bypasses a system center updates publisher (SCUP) such that manual intervention associated with implementing said third party patch file is reduced, and wherein an authorized user of said client is unable to access or view data of said third party patch file, and wherein users of said client, including any authorized users are prevented from accessing or viewing clear text in said third party patch file, wherein said data comprises said clear text, and wherein said first party, said second party; and
    said third party patch file agent including a patch file option selector, said patch file option selector configured to allow said authorized user of said client to select any options of said third party patch file or allow said user of said client to select which devices and which applications on said devices to which said third party patch file will be deployed.

6. The system of claim 5, wherein said third party patch file is encrypted.

7. The system of claim 5, wherein said client is a server.

8. A non-transitory computer-readable storage medium having instructions embodied therein when executed cause a computer system to perform a method for accessing a third party patch file for use in a second party system center configuration manager (SCCM) environment, said method comprising:
    automatically accessing a third party patch file by a third party patch file agent, wherein said third party patch file agent is located in a second party system center configuration manager (SCCM) environment, and wherein said SCCM environment operates on a client belonging to a first party;
    automatically providing said third party patch file, by said third party patch file agent, to a second party server update services (SUS) executing on said client, wherein said third party patch file bypasses a system center updates publisher (SCUP), said third party patch file agent automatically providing said third party patch file to said SUS without requiring manual intervention by information technology (IT) personnel, said third party patch file agent automatically transmitting said third party patch file to said SUS at a predetermined time interval, such that manual intervention associated with implementing said third party patch file is reduced, and wherein an authorized user of said client is unable to access or view data of said third party patch file, and wherein users of said client, including any authorized users are prevented from accessing or viewing clear text in said third party patch file, wherein said data comprises said clear text, and wherein said first party, said second party, and said third party are different parties; and said third party patch file agent including a patch file option selector, said patch file option selector configured to allow said authorized user of said client to select any options of said third party patch file or allow said user of said client to select which devices and which applications on said devices to which said third party patch file will be deployed.

9. The non-transitory computer-readable storage medium of claim 8, wherein said accessing a third party patch file by a third party patch file agent further comprises:

accessing a third party patch file from a cloud computing environment.

10. The non-transitory computer-readable storage medium of claim 8, wherein said accessing a third party patch file by a third party patch file agent further comprises:

accessing an encrypted third party patch file.

11. The non-transitory computer-readable storage medium of claim 8, further comprising:

selecting third party patches in said third party patch file to be implemented.

* * * * *